C. A. MEILICKE.
CALCULATOR.
APPLICATION FILED FEB. 19, 1914.
1,140,838.
Patented May 25, 1915.
3 SHEETS—SHEET 2.
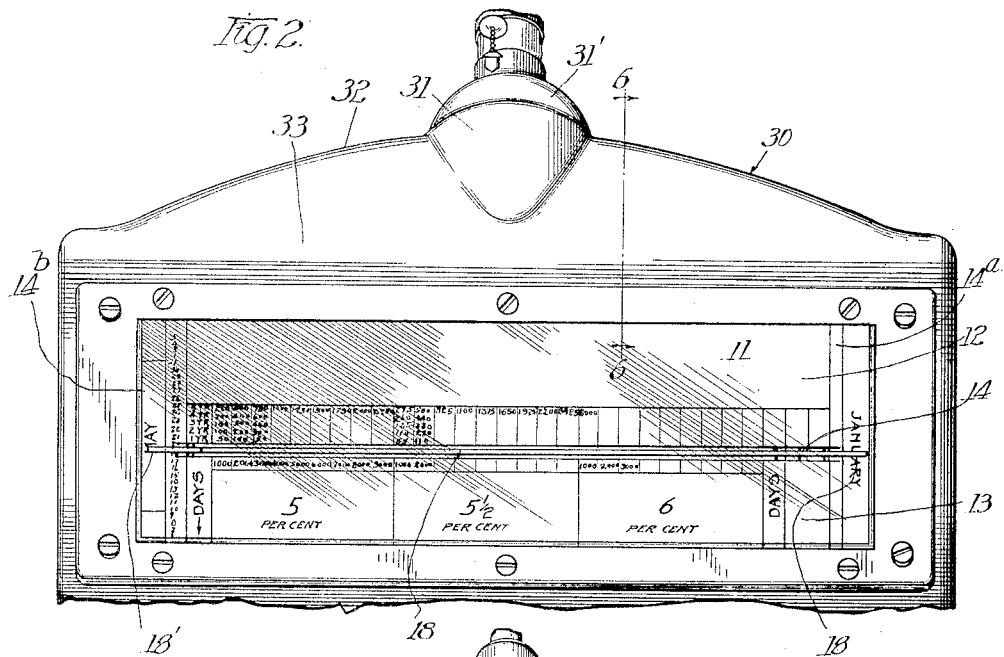
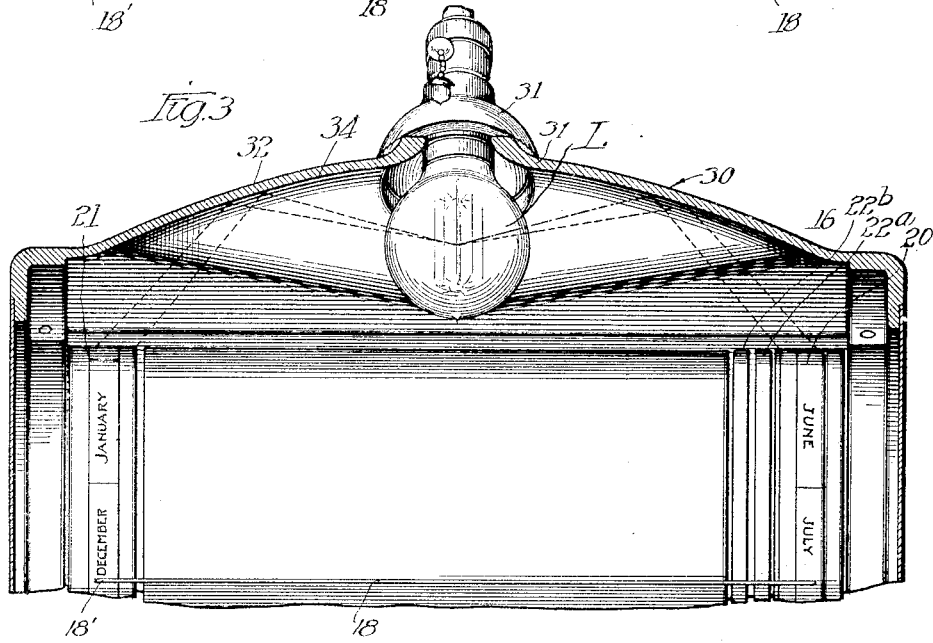

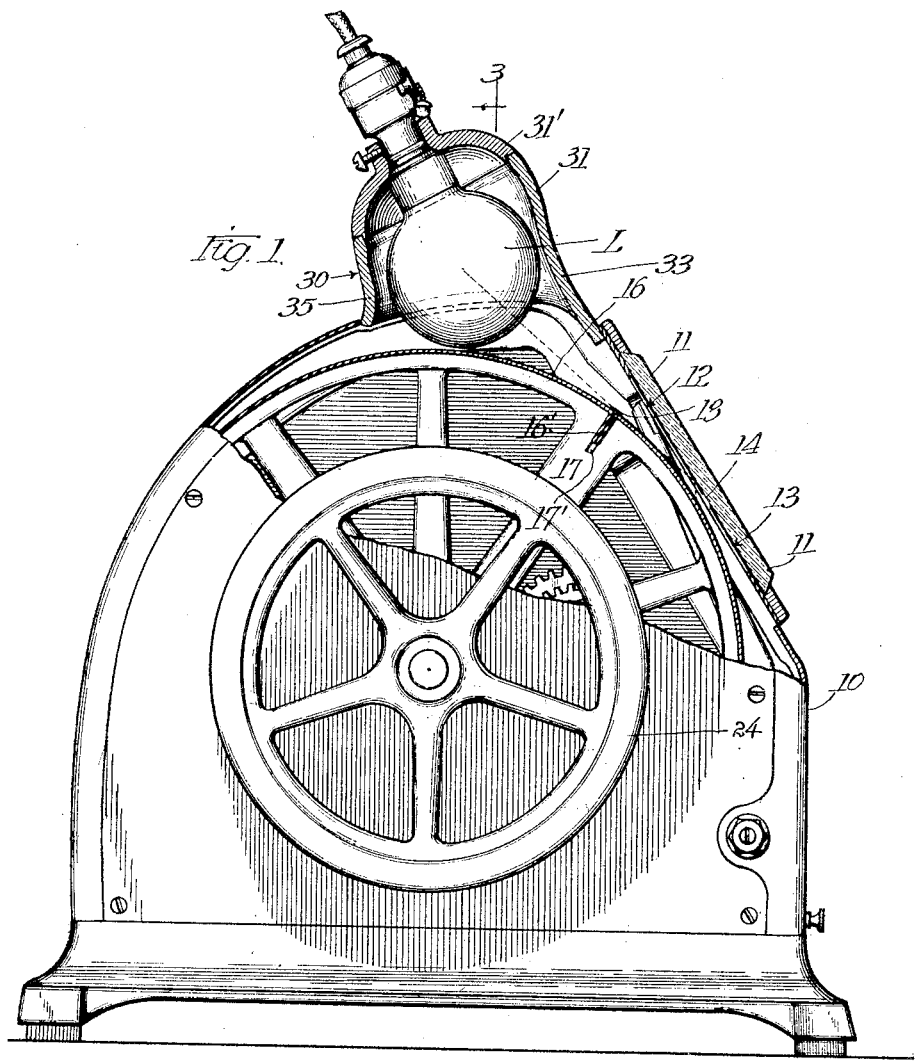

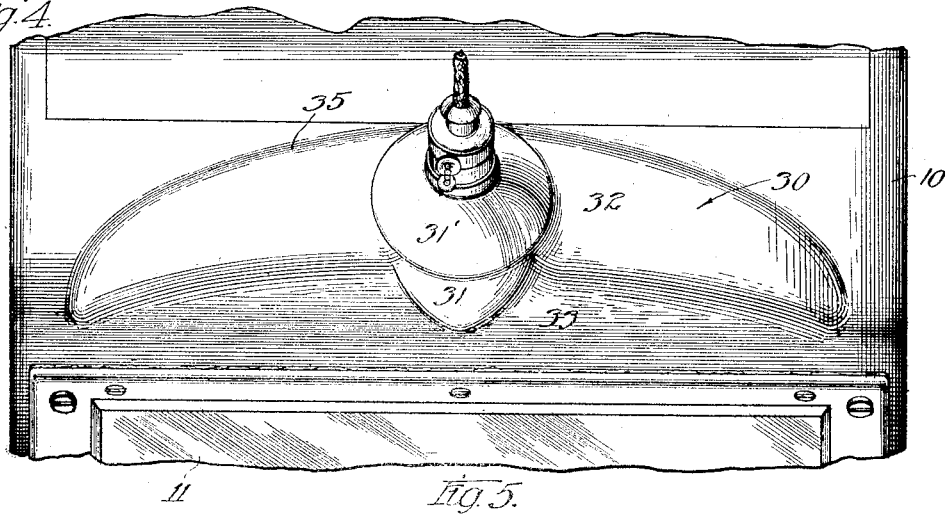
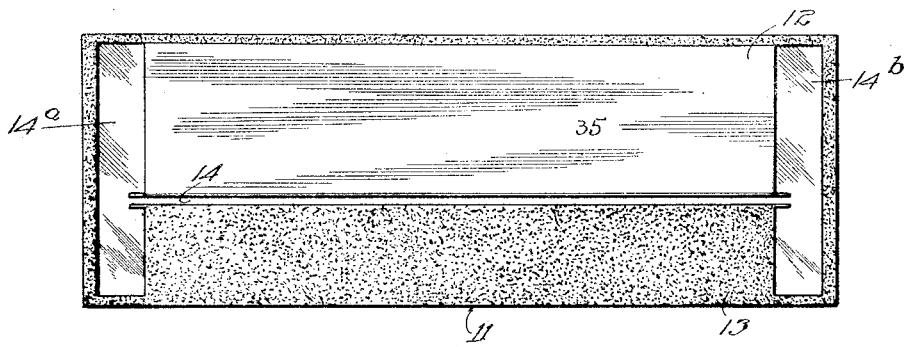
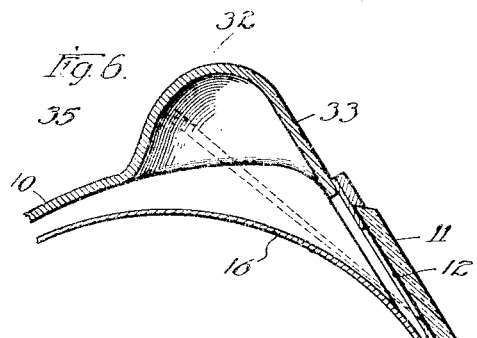

UNITED STATES PATENT OFFICE.

CARL A. MEILICKE, OF CHICAGO, ILLINOIS.

CALCULATOR.

1,140,838.   Specification of Letters Patent.   Patented May 25, 1915.

Application filed February 19, 1914. Serial No. 819,671.

*To all whom it may concern:*

Be it known that I, CARL A. MEILICKE, a subject of the King of Great Britain, residing at Chicago, in the county of Cook and State of Illinois, have invented certain new and useful Improvements in Calculators, of which the following is a specification.

My invention relates to improvements in machines for the variable display of numerical computations and like data, and in some of its features has particular reference to calculating machines, such as may be employed in the computation of time, interest, rates, wages, prices, and the like.

One of the objects of my invention is to provide a machine construction wherein the reading space of the machine, which is variable in its setting, may be powerfully illuminated.

Another object of my invention is to provide an improved construction for facilitating the setting and reading of calculating machines.

In the drawings wherein I have shown an exemplification of my invention Figure 1 is a view partly in side elevation and partly in transverse section of a time and interest calculating machine constructed in accordance with my invention. Fig. 2 is a front elevation of the face of the machine showing the indicating appliance. Fig. 3 is a section on line 3—3 of Fig. 1; Fig. 4 is a plan view of portions of the machine; Fig. 5 is a detail showing the reverse side of the sight glass and fixed charts. Fig. 6 is a section on line 6—6 of Fig. 2.

I have herein shown my invention as applied to a calculating machine of the type illustrated and described in my Patent No. 1,079,712 dated November 25, 1913. I will describe my present invention in connection with such a machine, although it will become apparent to those skilled in the art that some of the features thereof may be applied to machines widely differing in form, construction and use from the particular calculator herein shown.

In general the calculating machine comprises a casing 10 provided on a suitable surface with a sight glass 11, arranged substantially tangentially with respect to the data carrying rotors mounted within the casing. Immediately below this glass and preferably attached thereto by balsam cement or the like I provide two index scales 12 and 13, which in this form of machine are divided into vertical columns and horizontal divisions carrying permanent indicia by which the attention of the user is directed to the appropriate reading column of the movable chart. Between these fixed charts is a gap or slot 14, preferably of a width of one reading line of the movable chart, and preferably located in register with the line of tangency of the sight glass to the movable chart. The index scales do not extend to the extreme ends or sides of the sight glass, but terminate sufficiently far from the ends to leave an open space, $14^a$ and $14^b$, at each side through which to read the end columns of the movable charts. Within the casing is a rotor. The rotor or rotors mounted within the casing for movement with respect to the reading slot carry indicia for presentation to view through the reading slot and of course the number, arrangement, and data displayed by said rotary members may be widely varied. In the construction shown 16 indicates a main chart, arranged in drum form and bearing the tabulated information desired, mounted upon spiders 17. As illustrated in my prior patent this paper drum chart may have its meeting edges turned in as at 16′ in slots 17′ afforded therefor in the spiders and may be retained by a wedge member 18 the smooth surface of which constitutes a distinguishable datum line or zero mark for indication of a zero setting of the apparatus. In association with this zero line (which may, of course, be provided in other ways than by the chart securing wedge, in some aspects of my invention,) I provide extension markers 18′ extending out beyond the ends of the main chart to extend into longitudinal register with the unobstructed reading spaces or vertical slots $14^a$ and $14^b$ of the sight plate, heretofore described. This construction has a particular advantage in connection with the machine as herein illustrated, as the main chart 16 is supplemented by calendar wheels or drums 20 and 21 registering with the vertical reading slots $14^a$ and $14^b$, and the zero indicator extensions 18′ are arranged to span over, for variable indication upon, these calendar wheels. In the particular construction shown there are also associated with the calendar wheels and drums, holiday indicating wheels 22ª and 22ᵇ for purposes described in my said patent.

It is needless in this instance to consider in detail the operation of the calculator machine itself, further than to point out that by rotation of the hand wheel 24 upon the main shaft of the machine, all of the rotors may be rotated in unison, or by suitable brake mechanism and adjusting means the calendar wheels, holiday wheels and main chart may be displaced relative to each other for variation in the setting of the machine.

It will be noted that in the setting of the machine, the calendar wheels are visible through the vertical slots 14ª and 14ᵇ through a considerable arc and as for many operations of the machine it is necessary quickly and accurately to bring the zero mark into register with the reading slot 14, the extension of the zero indicator as at 18′, into register with the calendar wheel, is particularly advantageous. Even when the machine is being rapidly operated, so that the rotors are being moved at considerable speed through the operation of the hand wheel, the approach of the zero line from either direction toward register with the reading slot may be seen before the ultimate position of register is reached and therefore the machine may be set to bring the zero indicator into its desired position with a minimum loss of time for careful adjustment.

It is of course highly important in a machine of this type, and indeed in many classes of machines where a movable element carries desired data for display of the desired quantity through a sight aperture, that the portion of the movable member carrying the desired data shall be strongly illuminated when it is in display position. This is far more important of course than the illumination of the fixed scale, for in operation the fixed scales are generally well known to the user and it is the variable quantity which has to be ascertained and that it is important to read accurately.

In the construction herein shown the casing is provided with a lighting head, suitable to receive a source of illumination, such as an electric lamp, at a predetermined point, and to diffuse the light in suitable fashion for strong illumination of the reading line displayed, through the sight opening 14, substantially at the point of tangency of the sight glass and the rotary chart. It is my preference that the reflector structure for diffusion of the light be made a part of the casing proper, and in the particular construction shown the lighting head as a whole is indicated at 30. This light head is, in the specific construction shown, composed of a lamp receiving dome 31, in which an electric lamp L may be located with its effective center of illumination in a predetermined position, and into the said dome is merged the reflector wall of an elongated plano-parabolic reflector 32. The front wall 33 of said reflector is preferably substantially a planar continuation of the sight plate or glass 11, and the crown 34 and rear wall 35 are preferably curved surfaces compounded for the substantially uniform distribution of light rays throughout the considerable longitudinal extent of the reading line. These curves, of course, are figured for each individual size of machine in accordance with well known principles of light reflection, so that rays thrown on the rearwardly curved wall from the light center are reflected forwardly and downwardly or in the direction of the reading line, while the laterally dispersed rays are thrown downwardly from the crown 34 which has a suitable variation from true parabolic contour satisfactorily to illuminate the more remote areas at the sides or extremities of the reading line. As it is necessary to set the light center at a considerable distance from the reading line, and therefore the curvature of the rotor tends to prevent the direct impingement of the rays reflected from the light head upon the surface of the rotor exposed at the reading line, the focusing line for the reflecting surfaces of the lighting head is made slightly above the reading line upon the under surface of the sight plate or glass,—that is, upon the back surface of the chart 12, in the particular exemplification shown. This surface is therefore silvered as shown at 35, Fig. 5, and its reflection of the light thrown thereon illuminates the surface of the rotor exposed at the reading line, in a powerful and satisfactory fashion.

It will be observed that the construction above described satisfactorily surmounts the many difficulties in the illumination of a narrow reading line of a relatively large rotor very close to a tangent sight glass, and while in the present instance I have shown only a single embodiment of my invention for the necessary disclosure thereof, substantially the configurations shown in the drawings will be found to be highly efficacious in a machine of the proportions indicated.

As a matter of preferred mechanical construction I form the lighting head as a part of the machine casting and make the light dome 31 in two pieces, the cap 31′ being readily removable to permit the insertion and removal of the lamps L.

It is to be preferred that the indicia which are most used on the fixed scales to direct the attention of the operator to the particular columns of the rotor from which the desired information is to be gleaned shall be located on the scale below the sight opening, as this scale receives a material illumination due to the direct passage of light thereto and to refraction of the glass plate.

Having described my invention, what I claim is:—

1. In a machine of the character described, the combination of a casing, a data bearing rotor therein, said casing having a longitudinally extending sight opening therein at a point adjacent the rotor, a hollow head positioned at the longitudinal center of the casing and projecting outwardly therefrom at one side of the sight opening, a portion of the wall of said casing tapering outwardly and longitudinally from the ends thereof to said projecting head to form a paraboliform reflector, and a source of illumination insertible through an opening in said head.

2. In a machine of the character described, the combination of a casing, a data bearing rotor therein, said casing having a longitudinally extending sight opening therein at a point adjacent the rotor, a hollow head positioned at the longitudinal center of the casing and projecting outwardly therefrom at one side of the sight opening, a portion of the wall of said casing tapering outwardly and longitudinally from the ends thereof to said projecting head to form a paraboliform reflector, a detachable cap forming a part of said head, and a source of illumination carried by said cap and positioned within the casing when said cap is in place.

3. The combination with a curved data-bearing rotor, of a casing providing a planar part tangential to the rotor and having a long, narrow sight opening at substantially the line of tangency, a source of illumination within the casing, directing light into the angle between the rotor, and casing part, and a reflector on said casing part contiguous to the sight opening for reflecting said light onto the portion of the rotor which is exposed through said sight opening.

4. The combination with a curved data-bearing rotor, of a casing part substantially tangential thereto, having a narrow sight opening on substantially the line of tangency, a source of illumination carried by the casing, said casing provided with a reflector-surface directing the light into the angle between the rotor and casing part, and with a reflector surface on said casing part between the sight opening and the source of illumination reflecting the light onto the rotor-area exposed through said sight opening.

5. The combination with a machine comprising a casing and a data-bearing rotor, of a flat index-carrying face plate covering an opening in said casing and provided with a longitudinally extending sight opening at a point adjacent the rotor, a source of illumination in the casing near the periphery of the rotor at a point remote from the sight opening, a reflector-bearing head extending outwardly from the casing to inclose the source of illumination and direct the reflected light upon the rear of the face plate, and a reflector upon the rear of the face plate above the sight opening to redirect the light rays upon the portion of the rotor visible through the sight opening.

6. The combination with a machine comprising a casing and a data bearing rotor, of a flat index carrying face plate, covering an opening in said casing and provided with a longitudinally extending sight opening at a point adjacent the rotor, a source of illumination in the casing near the periphery of the rotor at a point remote from the sight opening, a reflector bearing head extending outwardly from the casing to inclose the source of illumination and direct the reflected light upon the rear of the face plate and a reflector upon the rear of the flat index carried by the face plate at the side of the sight opening toward the source of illumination to redirect the light rays upon the portion of the rotor visible through the sight opening.

In testimony whereof I hereunto set my hand in the presence of two witnesses.

CARL A. MEILICKE.

In the presence of—
STANLEY W. COOK,
MARY F. ALLEN.

Copies of this patent may be obtained for five cents each, by addressing the "Commissioner of Patents, Washington, D. C."